T. L. E. HAUG.
SERVICE BOLT FOR FASTENING STRUCTURAL WORK.
APPLICATION FILED FEB. 2, 1920.
1,404,955.
Patented Jan. 31, 1922.
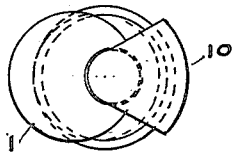
FIG. 1
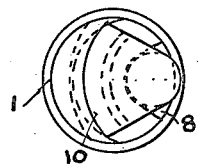
FIG. 4
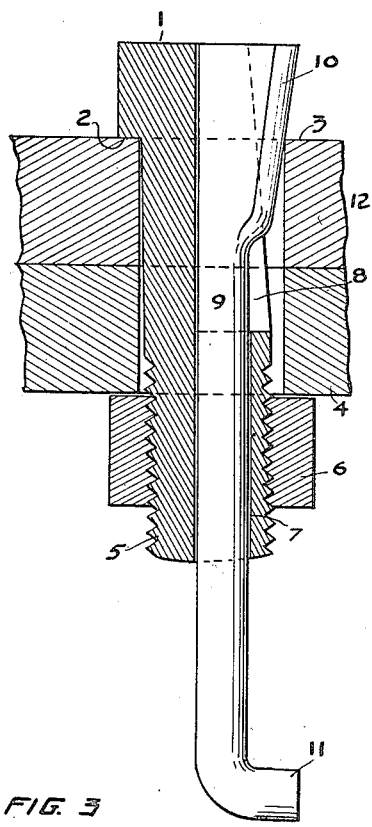
FIG. 2
FIG. 3
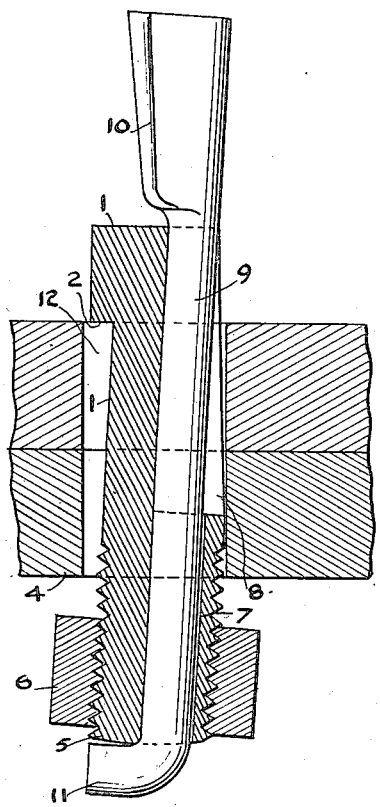
FIG. 5
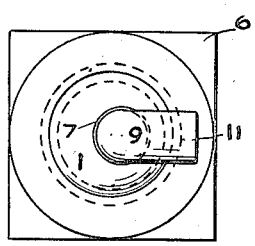
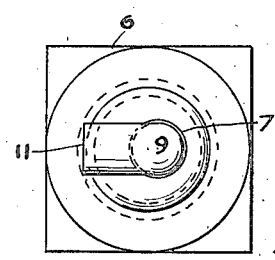
FIG. 6
INVENTOR
T. L. E. HAUG
BY
ATT'Y

UNITED STATES PATENT OFFICE.

THADDEUS L. E. HAUG, OF BERKELEY, CALIFORNIA.

SERVICE BOLT FOR FASTENING STRUCTURAL WORK.

1,404,955. Specification of Letters Patent. Patented Jan. 31, 1922.

Application filed February 2, 1920. Serial No. 355,732.

*To all whom it may concern:*

Be it known that I, THADDEUS L. E. HAUG, a citizen of the United States, residing at Berkeley, in the county of Alameda and State of California, have invented new and useful Improvements in Service Bolts for Fastening Structural Work, of which the following is a specification.

This invention deals with the temporary fastening together of structural parts, preparatory to fixing them in place permanently by riveting, welding, etc., and is especially applicable to ships, tanks, boilers and other structures wherein one side of the parts to be affixed is inaccessible from the other side.

It is customary to fasten such parts together by means of plain service bolts, each bolt being inserted in the holes provided for it by a man on one side of the work, who must hold the head of the bolt while the nut is applied to the opposite end by a man on the opposite side of the work. To insert the bolt in position its threaded end must be passed through the holes in the parts to be fastened together and in this process the threads are often damaged, delaying the work and shortening the life of the bolts. It is difficult for two men working on opposite sides of a steel plate to accurately coordinate their work, and it is a waste of labor to have a man on one side merely to insert bolts and hold their heads.

The purpose of this invention is to furnish a service bolt which can be fixed in place and removed by one man working upon one side of the members to be fastened together. An object of the invention is to provide a bolt having on one end an abutment in the form of a nut and on the other end means for locking the bolt in position, said means being operable to lock and unlock the bolt from the nut end and providing for such locking and unlocking and removal of the bolt without necessitating adjustment or removal of the nut. I therefore eliminate the necessity of screwing and unscrewing the nut and effect a saving in time and prevent wear on the threads of the bolt.

The invention possesses other advantages and features, some of which, with the foregoing will be set forth at length, in the following description where I shall outline in full, that form of the invention which I have selected for illustration in the drawings accompanying and forming a part of the present specification. In said drawings I have shown one form of the construction of my invention but it is to be understood that I do not limit myself to such form, since the invention as expressed in the claims may be embodied in a plurality of forms.

In the accompanying drawings:

Figure 1 is an end view of the head end of a bolt as it would appear when holding structural parts together.

Figure 2 is a fragmentary axial section of the parts showing the bolt in section.

Figure 3 is an end view of the nut end of the bolt.

Figure 4 is an end view of head end of bolt ready to be removed from the structure.

Figure 5 is a cross sectional view of the bolt ready for removal.

Figure 6 is an end on view of the nut end of the bolt when ready for removal.

Referring to the drawings, the bolt comprises a body 1, formed with a shoulder 2 adjacent to one end and on one side, which shoulder abuts against the structural member 3 when fastening it to the structural member 4. The nut end of the bolt is threaded as at 5, to receive an abutment or nut 6, and has a hole 7 extending longitudinally through the bolt to one side of the center thereof and into a slot 8, which slot is formed in the body of the bolt opposite the shoulder and extends longitudinally therethrough to the head end thereof. Through the hole 7 and slot 8 extends a wedge pin 9, formed with a wedging surface 10 at one end near the head end of the bolt and with a right angularly extending lug 11 at the other end the latter being so bent and formed after the wedge pin 9 is inserted through the hole 7. The lug 11 is adapted to be grasped by an appropriate tool from the nut end of the bolt.

To fasten together the members 3 and 4, the wedge pin 9 is drawn towards the head of the bolt as far as is permitted, as shown in Figure 5, bringing the wedging surface 10 clear of the slot 8, so that it can be turned towards the shoulder 2 and make the diameter of the bolt small enough to pass through the holes 12 in members 3 and 4. The bolt is then passed through members 3 and 4 until the shoulder 2 has passed the most remote surface of the inside member 3, whereupon the wedge pin 9 is turned through 180 degrees so that the wedge 10 can be pulled into the slot 8, as shown in Figure 2, and forced against the side of the hole in the member 3 opposite to the shoulder 2, thus preventing the displacement of the shoulder 2 when the bolt is tightened by setting up the nut 6.

To remove the bolt from the work prior to inserting a rivet, the lug 11 of the wedge pin 9 is knocked in toward the nut by a hammer and the wedge surface 10 at the head end of the bolt is moved out of locking position. By turning the bolt and wedge 10 so as to collapse the bolt, the bolt is permitted to pass back and out through the holes 12 in the members 3 and 4, without necessitating adjustment of the nut.

In practice it would be advisable to make the bolt body 1 of high tensile steel, to compensate for the reduced cross section and to increase the durability of the threads. Also, the wedging surface 10 could be provided with longitudinal saw teeth 13 or knurling, to assist in preventing the bolt from turning when setting up on the nut 6.

I claim:—

1. A bolt having a screw threaded end, a nut turned on said screw threaded end, the other end of the bolt having a shoulder formed thereon, and an element extending through the nut for locking the shoulder end of the bolt against withdrawal from an opening into which said last-named end has been inserted, said element being enlarged at one end thereof and arranged to engage the side of the openings into which the bolt has been inserted.

2. A bolt having a screw threaded end, a nut turned on said screw threaded end, an element slidable and extending through the nut for locking the other end of the nut and bolt against withdrawal from an opening into which said last-named end has been inserted, and a wedging surface on said element arranged to wedge against the side of the openings when said element is in position to hold the bolt against withdrawal.

3. A bolt having a screw threaded end, a nut turned on said screw threaded end, the other end of the bolt having a shoulder formed thereon, a pin slidably and rotatably mounted within the nut and extending longitudinally therethrough and adapted to lock the shoulder end of the bolt against withdrawal from an opening into which said shoulder end has been inserted.

4. A bolt having a screw threaded end, a nut turned on said screw threaded end, the other end of said bolt having a shoulder on one side thereof, a pin slidable and rotatably mounted within the bolt and extending longitudinally therethrough, and a wedge element on one end of the pin.

5. A bolt having a screw threaded end, a nut turned on said screw threaded end, the other end of said bolt having a shoulder on one side thereof, a pin slidable and rotatably mounted within the bolt and extending longitudinally therethrough, and a wedge element on one end of the pin, and a right angularly extending lug on the other end of the pin.

6. A bolt comprising a body with an abutment or shoulder on each end, a pin longitudinally slidable with reference to said bolt body, and having a wedging surface adapted to lock one end of the body against withdrawal from an opening into which said end has been inserted.

7. A bolt comprising a body with an abutment or shoulder on each end, a pin longitudinally slidable past each end of said bolt body to lock one end of the body against withdrawal from an opening into which said end has been inserted and arranged to be moved into and out of position locking said bolt without necessitating relative movement of said abutments.

8. A bolt comprising a body with an abutment or shoulder on each end, a wedging pin longitudinally slidable past each end of said bolt body and rotatable upon its own axis, to permit of inserting one end of the bolt into an opening, locking said end against withdrawal from said opening, and removing said end from said opening by manipulation of the wedging pin.

9. A bolt comprising a body having an abutment at each end adapted to overlie opposite sides of an object having an opening therein through which the bolt is inserted and means engaged with said bolt for locking one end of said bolt against withdrawal from said opening and which is movable into and out of said locking position without changing the distance between said abutments.

10. A bolt comprising a body with an abutment at each end arranged so that one end of the bolt is insertable through an opening and said abutments may be moved to overlie opposite sides of the object having the opening therein and means insertable into the opening for holding said bolt in position whereby said abutments will overlie said opposite sides of the object and the bolt is locked against withdrawal, which means is operable from one end of the bolt and capable of being moved into and out of position for such locking without necessitating changing the distance between said abutments.

11. A bolt comprising a body with an abutment at each end and a pin forming with said body a wedge for the purpose of locking the bolt against withdrawal from an opening into which it has been inserted and having its ends capable of extension beyond the abutments.

12. A bolt having an abutment at each end and means which may be moved into and out of position to lock said bolt against withdrawal and to permit its release while both abutments are maintained in fixed position on the bolt.

13. The combination of an object to be secured and a bolt adapted to be inserted through an opening in the object and having an abutment at each end, one of said abutments being of greater diameter than the opening through which the bolt is inserted and means which is operable from one end of the bolt for increasing and decreasing the diameter of the other abutment so as to lock and unlock the bolt relative to said opening while both abutments are maintained in fixed position on the bolt.

THADDEUS L. E. HAUG.